United States Patent Office 2,856,200
Patented Oct. 14, 1958

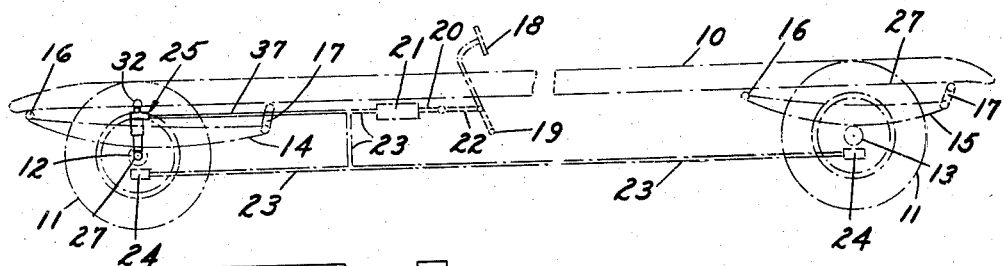
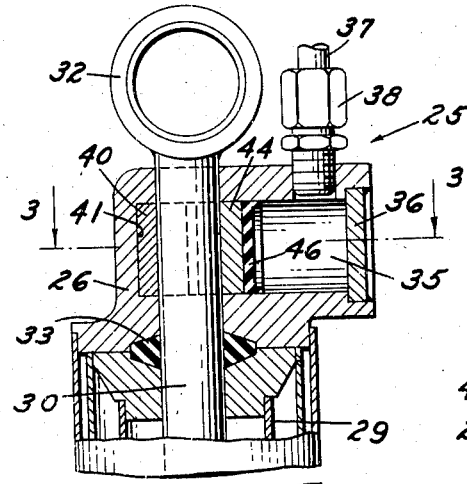
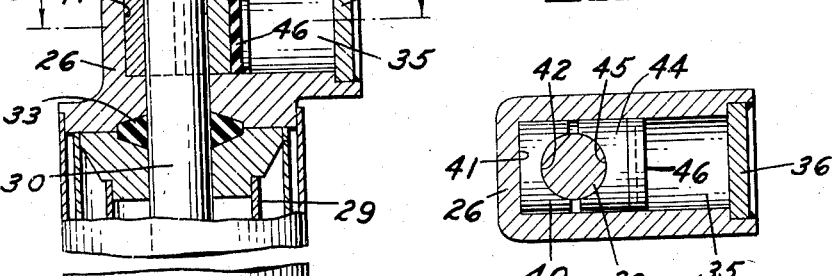
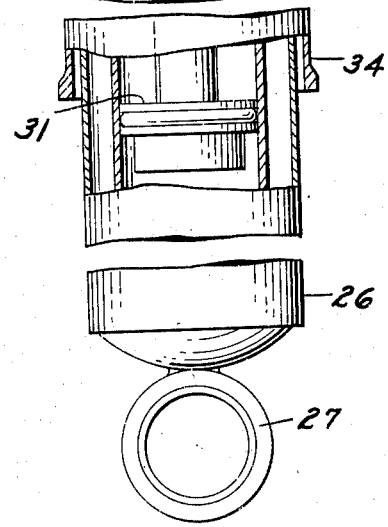

2,856,200

VEHICLE SHOCK ABSORBER BRAKE DIVE ARRESTER

Dominic M. Conflitti, Detroit, Mich.

Application March 19, 1956, Serial No. 572,401

4 Claims. (Cl. 280—124)

This invention relates to a shock absorber for use on vehicles. The invention is especially adapted to use on automobiles having hydraulic or other fluid-pressure braking systems.

It is well known that when the driver of a moving automobile applies his brakes, the nose of the car dips down. In sudden stops the dip may be sufficient to lower the front bumper of the car so that it will pass under the rear bumper of a car ahead with the result that a rear-end collision may cause extensive and costly damage to the body and mechanical parts at the front end of the rear car. This situation may be aggravated where the forward car is also being braked, since its rear end tends to elevate somewhat during a stop.

An object of this invention is to provide a simple, inexpensive shock absorber structure which will provide vertical support for a car to prevent the nose from dipping unduly during braking.

The invention generally contemplates providing the shock absorber body with a cylinder connected into the hydraulic brake system and a piston in the cylinder movable responsively to braking pressure to freeze the moving parts of the shock absorber and provide solid vertical support for the front end of the vehicle. One form of the invention is shown in the accompanying drawings.

Fig. 1 is a schematic illustration of a portion of a vehicle chassis with the shock absorber of this invention mounted thereon.

Fig. 2 is an enlarged side view of the shock absorber with parts shown in section and parts broken away to illustrate structure.

Fig. 3 is a sectional view on line 3—3 of Fig. 2.

Shown schematically in Fig. 1 is a portion of the chassis of a vehicle such as an automobile having a frame 10, ground engaging wheels 11, and suitable conventional wheel suspension which, for convenience, is shown as including front and rear axles 12 and 13 secured respectively to front and rear springs 14 and 15 shackled to frame 10 as at 16 and 17. Springs 12 and 13 are illustrated as being of conventional leaf spring type. The vehicle has a hydraulic braking system which includes a braking pedal 18 pivoted on the frame at 19 and connected to the piston rod 20 of a master hydraulic cylinder 21 through a link 22. Hydraulic fluid lines 23 hydraulically connect master cylinder 21 to brake actuating cylinders 24 at the wheels.

A shock absorber 25, according to this invention, has a body 26 with a ring 27 adapted to be secured to a portion of the wheel suspension such as one of the axles 12—13 adjacent each wheel. Body 26 has a cylinder 29 into which a rod 30 slidably projects. The inner end of rod 30 carries a piston 31 which cooperates with cylinder 29 in a known manner to provide a conventional shock absorber, and the outer end of rod 30 has a ring 32 adapted to be secured to vehicle frame 10. A seal 33 is provided between rod 30 and body 26 and an outer protective cover 34 is secured on the body.

Body 26 has an internal bore 35 closed at one end as by a welded plate 36 to provide a hydraulic cylinder. The cylinder has an opening at one end with a fitting 38 threaded therein, the fitting being arranged to be connected to a hydraulic line 37 which communicates hydraulically into a brake fluid line 23. Rod 30 projects through cylinder 35, and the axes of the rod and cylinder are preferably generally perpendicular to each other.

A cylindrical insert 40 is provided between rod 30 and one end 41 of cylinder 35. One side of the insert abuts against end wall 41 of the cylinder and the other side of the insert is contoured as at 42 to mate with rod 30 (Fig. 3). A piston 44 in cylinder 35 has an end 45 contoured to mate with rod 30 and preferably is provided with a seal element 46 at its other end. In the form of the invention illustrated rod 30 has round sectional shape, and contoured surfaces 42 and 45 of the insert and piston are generally semi-circular.

In use it may be assumed that shock absorber body 26 has been fastened to vehicle frame 10, rod 30 has been secured to an axle 12—13, and that cylinder 35 has been connected into the braking system through hydraulic line 37. During operation of the vehicle with the brakes released, the pressure in cylinder 35 is relieved and rod 30 slides freely through the cylinder between piston 44 and insert 40. The shock absorber thus functions in the usual manner to dampen relative movement of wheels 11 and frame 10 of the vehicle.

When brake pedal 18 is depressed, master hydraulic cylinder 21 is actuated to create hydraulic pressure in brake lines 23 for actuating brake cylinders 24 to operate the brakes and decelerate the vehicle. At the same time, hydraulic pressure is introduced through line 37 into cylinder 35 forcing piston 44 to the left, as the drawings are viewed, into tight engagement against rod 30. Rod 30 is clamped between the piston and insert 40 which is firmly supported by end 41 of the cylinder. This freezes rod 30 to body 26 and prevents relative motion of wheels 11 and vehicle frame 10 while the brake system is actuated. The shock absorbers thus provide solid vertical support for the front end of the car and prevent the nose of the car from dipping. The front bumpers of the car will remain generally in vertical alignment with the rear bumpers of a car in front so that in the event of a rear-end collision damage will be minimized.

When brake pedal 18 is released, master cylinder 21 is inactuated, the hydraulic pressure in brake lines 23 is relieved, and brake cylinders 24 are inactuated to release the brakes. At the same time, the pressure in hydraulic line 37 and cylinder 35 is relieved, releasing piston 40 from clamped engagement against rod 30 so that the rod resumes free motion through cylinder 35. The shock absorber is thus free to resume its normal function of dampening relative movement between wheels 11 and frame 10.

Seal 46 is influenced by hydraulic pressure in cylinder 35 to form a seal at the edges of piston 44. The round cross sectional shape of rod 30 and the mating generally semi-circular contour of insert 40 and piston 44 provide maximum friction surfaces for freezing rod 30 to body 26.

The invention provides a safety feature for occupants of a vehicle to which it is applied. In sudden braking the nose of a vehicle may dip sharply causing a forward rotation of the vehicle seats and tending to throw occupants of the seats forwardly. This invention solidly supports the front end of a car during braking and eliminates the forward rotation of the seats so that there is less tendency to throw the seat occupants forwardly. The probability of injury to a passenger in a car equipped with this invention is thus diminshed.

I claim:

1. A shock absorber for a vehicle having a frame, yieldably suspended wheels and a fluid pressure operated braking system, said shock absorber comprising, a body member and a rod member which are movable relatively to each other, one of said members being adapted to be connected to a vehicle frame, the other member being adapted to be connected to the vehicle suspension, said shock absorber including yieldable means operatively interposed between said members to resist relative movement thereof for dampening relative movement of the vehicle wheels and frame, said shock absorber also including means forming a cylinder in fixed relation to said body member and adapted to be connected to the fluid pressure braking system of the vehicle and means forming a piston in said cylinder, said rod member projecting slidably through said cylinder, the axes of said cylinder and rod member being transverse to each other, said piston being movable against said rod member upon introduction of braking pressure into said cylinder so that said piston and cylinder cooperate to hold said members against relative movement whereby to prevent relative movement of the vehicle wheels and frame while the vehicle brakes are actuated, said piston being releasable from clamped relation with said rod member responsively to relief of braking pressure whereby to free the vehicle frame and wheels for relative movement when the brakes are released.

2. A shock absorber for a vehicle having a frame, yieldably suspended wheels and a fluid pressure operated braking system, said shock absorber comprising, a body member and a rod member movable relatively to each other, one of said members being adapted to be connected to a vehicle frame, the other member being adapted to be connected to the vehicle wheel suspension, said shock absorber including yieldable means operatively interposed between said members to resist relative movements thereof for dampening relative movements of the vehicle wheels and frame, said shock absorber also including, means forming a cylinder in said body member adapted to be connected to the fluid pressure braking system of the vehicle and means forming a piston in said cylinder, said rod member projecting slidably through said cylinder, the axes of said cylinder and rod member being transverse to each other, means providing a stationary element supportingly and slidingly engaging one side of said rod member at the interior of said cylinder, said piston being movable against the other side of said rod member upon introduction of braking pressure into said cylinder so that said piston and stationary element cooperate to clamp said rod member and hold said members against relative movement, whereby to prevent relative movement of the vehicle wheels and frame while the vehicle brakes are actuated, said piston being releasable from clamped engagement against said rod member responsively to relief of braking pressure, whereby to free the vehicle frame and wheels for relative movement when the brakes are released.

3. The shock absorber defined in claim 2 wherein the portions of said piston and stationary element which engage said rod member are contoured to mate with the contour of said rod member.

4. The shock absorber defined in claim 2 wherein said rod member is substantially round and the portions of said piston and stationary element which engage said rod member have generally circular contour mating with the round contour of said rod member.

References Cited in the file of this patent

UNITED STATES PATENTS 2,574,280    Obert _____ Nov. 6, 1951